United States Patent
Iannazzo et al.

(10) Patent No.: US 9,028,901 B2
(45) Date of Patent: May 12, 2015

(54) PUFFED OAT BASED BREAKFAST CEREAL OF ENHANCED SALTY FLAVOR PERCEPTION AND METHOD OF PREPARATION

(75) Inventors: Anna Iannazzo, St. Louis Park, MN (US); Sarah Woodling Houle, Golden Valley, MN (US)

(73) Assignee: General Mills, Inc., Minneapolis, MN (US)

( * ) Notice: Subject to any disclaimer, the term of this patent is extended or adjusted under 35 U.S.C. 154(b) by 653 days.

(21) Appl. No.: 13/116,132

(22) Filed: May 26, 2011

(65) Prior Publication Data

US 2011/0305800 A1    Dec. 15, 2011

Related U.S. Application Data

(60) Provisional application No. 61/354,383, filed on Jun. 14, 2010.

(51) Int. Cl.
*A23L 1/164* (2006.01)
*A23L 1/18* (2006.01)

(52) U.S. Cl.
CPC ............. *A23L 1/164* (2013.01); *A23L 1/1802* (2013.01); *A23L 1/1817* (2013.01)

(58) Field of Classification Search
CPC ............. A23V 2002/00; A23V 2250/5118; A23V 2250/1614; A23V 2250/16; A23V 2200/22; A23L 1/005; A23L 1/1802; A23L 1/1823; A23L 1/0047; A23L 1/364; A23L 1/18; A23L 1/1805; C11D 17/0039
USPC ............. 426/302, 96, 649, 658, 94, 621, 559, 426/618, 619, 648, 440, 450, 620, 625, 436, 426/449

See application file for complete search history.

(56) References Cited

U.S. PATENT DOCUMENTS

| | | | |
|---|---|---|---|
| 2,596,333 A | 5/1952 | Halpern et al. | |
| 3,231,387 A | 1/1966 | Tsuchiya et al. | |
| 3,246,990 A | 4/1966 | Thompson et al. | |
| 4,963,373 A | 10/1990 | Fan et al. | |
| 4,988,521 A | 1/1991 | Fan | |
| 5,206,049 A | 4/1993 | Fielding et al. | |
| 5,510,130 A * | 4/1996 | Holtz et al. | 426/93 |
| 2005/0064079 A1 * | 3/2005 | Allen et al. | 426/549 |

OTHER PUBLICATIONS

Hooge, S., Impact of Potassium Chloride on Saltiness, Bitterness, and Other Sensory Characteristics in Model Soup Systems, Food Science Graduate Program, Kansas State University, 2008, 208 pages.

* cited by examiner

*Primary Examiner* — Michele L Jacobson
*Assistant Examiner* — Hong T Yoo
(74) *Attorney, Agent, or Firm* — Diederiks & Whitelaw, PLC; Gregory P. Kaihoi

(57) ABSTRACT

Methods of preparation and improved oat based puffed R-T-E or breakfast cereal products resulting there from with reduced sodium levels that provide good cooked grain flavor relative to other low or no sodium cooked cereal products and that approach the quality of higher sodium level products are provided. The methods include formulating cooked cereal doughs with minimal levels of sodium chloride and including a blend of potassium chloride and choline chloride. The cooked cereal dough is formed into pellets and gun puffed to form puff products having a total pyrazine content of at least 200 ppm. The puffed products are topically coated with saline solution and dried to provide the present improved low sodium high flavor finished breakfast cereal products.

10 Claims, No Drawings

PUFFED OAT BASED BREAKFAST CEREAL OF ENHANCED SALTY FLAVOR PERCEPTION AND METHOD OF PREPARATION

CROSS-REFERENCE TO RELATED APPLICATIONS

This application claims the benefit of priority under 35 U.S.C. 119(e)(1) of a provisional patent application, Ser. No. 61/354,383, filed Jun. 14, 2010, which is incorporated herein by reference in its entity.

BACKGROUND OF THE INVENTION

Ready-to-eat cereals are well known and popular food items. Ready-to-eat ("R-T-E") or breakfast cereals come in a wide variety of shapes, sizes, compositions, and flavors. Of long standing popularity are traditional R-T-E cereals including unpuffed products such as whole wheat flakes, or corn flakes, and puffed cereals, including oat based puffed O's. Traditionally, the products have been and are prepared by extended cook steps which develop flavorful, fully cooked cereal flavors. While popular, R-T-E cereals having a traditional, fully developed cereal flavor characteristic of long cooking, typically have high sodium content. The sodium content not only is important to the cereal flavor development during the extended cooking step, but also, salt acts as a strong flavor potentiator in the finished cereal product. Also, salt improves color generation and reduces required cook times.

Sodium chloride concentrations of from 2% to 4% have been typically used in the past for R-T-E cereal compositions. Current nutritional and health awareness regarding prepared consumer food products continue to include concerns regarding sodium intake. Producers continue to develop low sodium or reduced sodium variants of their products that provide lower sodium levels while maintaining as best as they can the acceptably salty flavors. Due to the current health focus on sodium in the diet, however, present food industry trends have been to express salt content as milligrams sodium per serving, often one ounce (dry weight) of product. In these units, a popular brand of traditional whole wheat flakes has in the past contained as much as 480 milligrams sodium per ounce of product (i.e., about 3% sodium chloride in the product formula).

Salt reduction is desirable from a reduction in sodium dietary intake standpoint, the dietary benefits of reduced sodium intake has been seen as being achieved at the expense in the decline of benefits such as decline in the desirable taste, appearance and physical properties of the finished product. The finished low sodium breakfast cereal products can have less salty, cooked cereal and toasting flavors, a bland taste and also may be lighter in color. Together, these negative changes in products attributes lead to lower product quality and risk of lower consumer acceptance for a staple food category that plays an important role in a healthy diet. Further, the low sodium breakfast cereal can be more brittle leading to increased breakage and processing losses due to excessive fines generation. The finished products can exhibit less expansion and thus are harder and less tender in eating quality. While not noticeable to the consumer, sodium chloride reduction can also result in increased processing costs to the consumer food product manufacturer due to increased cook times. Increased cook times lead to increases in capital, labor and operating costs especially energy leading to higher product costs.

Various efforts have been made over the years to reduce the sodium content of R-T-E cereals while nonetheless maintaining, insofar as possible, the desirable popular flavor of such products. Conventionally, such approaches have been to substitute other cations (e.g., potassium and/or ammonium) for sodium, to increase the cooking step, to add flavor precursors, to increase minor flavor constituents, e.g., malt, and or to add sugars for browning (see, for example, U.S. Pat. No. 4,963,373 "R-T-E Cereal Composition and Method of Preparation" issued Oct. 16, 1990 to Fan et al.) to offset the lack of color development. These approaches have met with some success in reducing the overall sodium content to about 300 milligrams sodium per ounce, while suffering some trade-offs with regard to flavor. In other approaches, the reduced sodium chloride content is partitioned between a first portion being part of the cooked cereal formulation and a second portion being topically applied for maximum flavor and salty taste impact (See, for example, U.S. Pat. No. 4,988,521 Ready-To-Eat Cereal of Reduced Sodium Content and Method of Preparation" issued Jan. 29, 1991 to Fan et al.).

A conventional approach is to provide all or a portion of the sodium chloride with a non-sodium salt especially potassium chloride ("KCL") or other salts. However, many consumers are sensitive to a bitter flavor associated with KCl. For this reason, the art has long sought techniques to reduce the negative taste of KCl (see, for example, U.S. Pat. No. 2,596,333 "Dietary Salt Substitute" issued May 1952) such as blending with flavor masking additives or employing other potassium salts. (See, for example, U.S. Pat. No. 5,206,049 "Choline-Containing Compositions as Salt Substitutes and Enhancers and a method of Preparation issued Apr. 27, 1993 to Fielding et al.)

In other approaches, various salty flavor ingredients have been developed as "salt enhancers" that enhance the saltiness perception of any salt or sodium chloride in a food product.

Notwithstanding all the attempts to provide salt (sodium chloride) substitutes, salt enhancers or salt mimics, saltiness perceptions remains primarily dose responsive, i.e., add more salt/increase salt concentration and the product tastes saltier; reduce salt addition and the product is less salty tasting. Thus, still another approach is for producers to gradually reduce the sodium chloride level in familiar products such that over time, consumers' tastes are gradually weaned away from higher salt levels to lower salt levels.

Still another approach is to partition the sodium chloride content with a first portion being a part of the body of a food product piece and with a second portion being topically applied to its surface. By such partitioning between body and surface, the sodium chloride level can be reduced while maintaining saltiness taste perception. The product still employs sodium chloride, but the position of that sodium chloride can be used to influence saltiness perception. (See, for example, U.S. Pat. No. 4,988,521 "Ready-To-Eat Cereal of Reduced Sodium Content and method of Preparation issued Jan. 29, 1991 to S. T. Fan). Of course, such a technique can be employed with one or more other sodium reduction techniques, e.g., using KCl in full or partial substitution.

Notwithstanding past efforts at providing reduced sodium consumer food products, there is a continuing need for new and useful techniques to provide low sodium food products, especially breakfast cereal products, that enhance saltiness taste perception thereby either increasing saltiness at specific sodium chloride concentrations or allowing reductions in sodium chloride concentrations (and thereby in sodium levels or loads) while maintain equivalent levels of salty taste and cereal flavor.

BRIEF SUMMARY OF THE INVENTION

The present invention relates to food products and to their methods of preparation especially puffed breakfast or Ready-To-Eat Cereal products. More particularly, the present invention relates to breakfast or Ready-to-eat cereal products of reduced sodium or sodium chloride content and to their methods of preparations.

The present invention is thus directed towards formulating and preparing improved oat based puffed R-T-E or breakfast cereal products with reduced sodium levels that provide good cooked grain flavor relative to other low or no sodium cooked cereal products and that approach the quality of higher sodium level products. Surprisingly, the present invention provides cereal product preparation methods and products resulting there from that have improved, traditional cooked cereal flavor while nonetheless employ lower sodium levels. In one embodiment of the present invention, the present methods comprise improvements in traditional, slow cook cereal cooking preparation of a cooked cereal mass.

In its method aspect, the present invention provides methods for preparing R-T-E cereals of reduced sodium content but whose taste profile is organoleptically and analytically comparable to conventional cereals having higher sodium concentrations. The present methods include the steps of:

Providing a dry starting ingredient blend, comprising;
  About 50% to 99% of the dry blend of a cereal ingredient having a starch component and a protein content;
  Sufficient amounts of soluble sodium salts to provide a sodium concentration of about 50 to 140 mg/ounce (dry basis) in the dry blend to define a first sodium portion;
  About 14 to 100 mg/ounce of potassium chloride;
  About 55 to 150 mg/ounce of choline chloride;
Cooking the dry blend with sufficient amounts of moisture to provide a cooked cereal dough having a moisture content of about 25 to 35% and wherein at least 90% of the starch is gelatinized;
Forming the cooked cereal dough into puffable pellets having a moisture content of about 8-15% (said pellets having a pellet count of about 10-100 per 10 g and wherein the dough has an initial pyrazine level of 100 ppm or less;
Puffing the puffable pellets to provide puffed pieces by heating the pellets to about 120 to 482° C. under pressure ranging from about 0.22 to 1.47 MPa. (30 to 200 psig.). for times sufficient to develop pyrazine flavor constituents and explosively discharging the heated pellets to atmospheric pressure whereby the moisture rapidly expands to puff the pellets and to provide puffed cereal pieces having a moisture content of about 3-7% and a pyrazine content of at least 200 ppm;
topically applying to the puffed cereal pieces an aqueous saline solution having sodium chloride in amounts sufficient so as to apply a second portion of sodium chloride to the surface in a weight ratio of sodium chloride to cereal pieces such that the total sodium content provided by the first and second sodium portions ranges from about 0.1 to 1.3% by weight to form cereal pieces coated with the second salt portion; and
final drying the coated cereal pieces to a moisture content of about 1% to 5% by weight.

In its product aspect, the present invention relates to finished R-T-E cereals products wherein the total sodium content can be reduced without sacrificing the degree of taste achieved. The sodium reduction can be achieved by providing cooked cereal doughs wherein the sodium is reduced by up to ¾ by employing a blend of potassium chloride and choline chloride as sodium chloride substitutes. In one product aspect, the present products are in the form of cooked cereal doughs. In another variation, the products are in the form of discrete puffed cereal pieces fabricated from such cooked cereal doughs. Another feature of the sodium reduction is achieved by distributing the reduced sodium chloride content between a portion being distributed uniformly throughout the cereal piece and a second portion being uniformly topically applied to the cereal pieces' exterior. The cereal pieces are dried to shelf stable moisture contents ranging from about 1-5% to provide finished RTE cereal products. The products are characterized by having a pyrazine content of at least 200 ppm.

DETAILED DESCRIPTION OF THE INVENTION

The present invention relates to R-T-E cereals, particularly puffed, having a reduced sodium content. In its method aspect, the present invention relates to processes for the preparation of such R-T-E cereals employing a starting cereal blend including coarse salt (sodium chloride). Each of these components as well as product properties, preparation and use are described in detail below.

Throughout the specification and claims, percentages are by weight and temperatures in degrees Centigrade unless otherwise indicated. Each of the referenced patents is incorporated herein by reference.

The present products include cooked cereal doughs, intermediate dough products such as cereal pellets or snack food half products and finished dried food products prepared there from. While in the current description particular attention is paid to the provision of such finished cooked cereal dough products such as Ready-To-Eat or breakfast cereals and to fried or baked snacks, the skilled artisan will appreciate that the present invention finds suitability for use in connection with the provision of a variety of other food products from cooked cereal doughs. For example, baked or expanded products in the form of breakfast or quick bread bars or cylinders. Also, while the present invention is particularly directed towards the provision of food products intended for human consumption having the particular higher organoleptic qualities such human food products require, the present invention can also find suitability for use in the provision of food products intended for animal consumption such as pet foods.

Various popular R-T-E cereals, e.g., toasted whole wheat flakes sold under the Wheaties®, have an established taste profile including an established or "full sodium chloride" concentration to which consumers have become accustomed. While the selection of the sodium chloride concentrations of these full sodium chloride products may once primarily have been an optimized choice, once the customer base has become familiar with the original taste profile, great care must be taken to insure that deviations in all ingredients, including especially sodium chloride, must be kept to an absolute minimum in order to avoid deviations in organoleptic properties. Any modifications in the product must be proven by hedonic testing not to affect materially this established taste profile unless the modification clearly results in an improvement in flavor. If whole wheat flakes otherwise identical but of reduced sodium concentration, e.g., reduced by one third, were to be prepared, then the average consumer would immediately discern undesirable taste deterioration. Similar problems would exist with other R-T-E cereals, e.g., puffed, ring shaped whole oat flour based cereals such as marketed under the Cheerios® although the established sodium chloride concentration will vary modestly between about 1.8% to 4.0% sodium chloride.

It is important in the present invention that R-T-E cereal pieces be employed whose sodium content has been reduced up to three fourths from their established or conventional full sodium value, i.e., ranging from about 0.41% to 1.3% sodium chloride, preferably about 0.35% to 0.8% or for best results less than 1%. It is also important that the first salt portion be uniformly distributed throughout the cereal piece. All manner and types of R-T-E cereal pieces can be employed in the present invention including those cereals based upon cooked cereal doughs of wheat, whole wheat, corn, rice, barley, oats and mixtures thereof. The dried cooked cereal dough pieces can be of any shape and size including puffed and toasted, and whether or not vitamin fortified or other forms, such as corn flakes, shredded wheat, puffed wheat, puffed rice, expanded oats, puffed corn, bran flakes, whole bran cereal, breakfast cereals in the form of extruded and puffed doughs, and the like. Of course, the R-T-E cereal art is well developed and the skilled artisan will have no difficulty selecting cereal formulations and preparation techniques for the provision of R-T-E cereal pieces herein of reduced sodium content.

The present invention finds particular suitability for use in connection with puffed oat based rings and with toasted oat based flakes. While the present invention can be used in connection with sugar coated cereals, the present invention finds particular suitability for use in connection with non-sugar coated cereals since sugar coating may mask modestly the benefits of the present invention.

In the preferred embodiment, the present cooked cereal composition preparation method involves a first step of the preparation of a homogeneous blend of the cereal composition ingredients. Of course, the principal component of the present cereal composition is a starchy cereal component. The cereal component can comprise any conventionally employed starchy cereal or, synonymously, farinaceous material, for use in a ready-to-eat cereal. Exemplary suitable starchy cereals include cereal flours from wheat, rice, corn, oats, barley, rye or other cereal grains and mixtures thereof. Oat based flours and cereal ingredients are preferred. The flours can be whole flours or flour fractions such as with the germ fraction or husk fraction removed. Of course, the R-T-E cereal art is well developed and the skilled artisan will have no difficulty selecting suitable farinaceous materials for use herein. The starchy cereal component can comprise from about 60% to 95% (dry basis) of the homogeneous blend. For best results, the starchy cereal component comprises about 65% to 70%.

In addition to major cereal grains, the grain materials can also be supplied in whole or in part by such minor or "heritage" grains such as spelt, kamut, quinoa and mixtures thereof. While not produced in large quantities, such heritage grains are especially popular among those interested in organic foods. In less preferred variations, the cut grain pieces can be substituted with equivalent amounts or levels of other finer sized cereal ingredients such as cereal flours.

In certain embodiments, the cooked cereal dough can be formulated to be more readily puffable such as by deep fat frying, microwave heating, gun puffing, jet zone heating, direct expansion, etc. More easily puffed doughs can have high levels of amylopectin-type starch supplied either by selection of high amylopectin containing starchy cereal materials, or by addition of pure amylopectin starches or both. By high amylopectin level herein is meant greater than 20% up to about 80% by weight (dry basis). In still other variations, the puffed cereal pieces can comprise pure starches or pure modified starches to assist in providing desired puff volumes.

Thus, the present cooked cereal dough products can optionally additionally comprise minor amounts such as 1% to 30%, preferably about 1% to 12%, of one or more of such supplemental starchy cereal components. The starchy cereal component can comprise any conventionally employed starchy cereal or, synonymously, farinaceous material, for use in a ready-to-eat cereal. Of course, the R-T-E cereal art is well developed and the skilled artisan will have no difficulty selecting suitable farinaceous and/or starchy materials (e.g., potato starch) for use herein.

Still another component of the blend is common salt, sodium chloride. Conventionally, sodium concentrations in the cooked cereal dough, when used for whole wheat flakes or oat rings, for example, have in the past ranged from about 250 to 400 milligrams per ounce of dried R-T-E cereal. Generally, to achieve such sodium concentrations in the finished product, the make-up cereal blend would comprise about 2% to 4.0% by weight sodium chloride. In contrast, in the present invention, the blend essentially comprises from about 0.1% to 1.3% sodium chloride, preferably 0.35% to 0.8%. For best results in terms of sodium ion concentration reduction balanced with flavor, the sodium chloride content should be about 0.6%. Such concentrations can also be expressed equivalently in mg Na per ounce (dry weight). In the present invention sodium levels of less than 125 mg/oz are preferred, more preferably less than 80 mg/oz.

Of course, specific sodium concentrations within the above-described essential ranges will be modified and selected, in view of the end product attributes desired, as well as the farinaceous material(s) employed. Generally, however, the sodium concentrations employed herein are about 25% to 75% less than the salt levels which would otherwise be conventionally employed. Further, suitable selected sodium chloride concentrations will be modestly influenced by the finishing steps of flaking, puffing, etc. which are selected.

The blend additionally can additionally comprise a blend of potassium chloride (KCl) and choline chloride ($C_5H_{14}ONCl$), each in defined amounts. The present invention resides in part upon the surprising discovery that cereal compositions can be prepared having reduced sodium content but nonetheless equivalent cooked cereal flavor when the cereal component is cooked in an aqueous solution comprising potassium chloride and choline chloride. Importantly, selection of these particular water soluble chloride salts amongst other possible salts (e.g., $MgCl_2$, $CaCl_2$) is important to realizing the desirable salty taste and cereal flavor while minimizing undesirable off flavors that such other salts can exhibit.

In a preferred form, the ratio of potassium chloride to choline chloride can range from about 1:2 to about 2:1. More preferably, a lesser amount of potassium chloride is employed in combination with a greater amount of choline chloride. In one useful particular formulation the weight ratio is about to a 40:60 ratio of KCl: Choline chloride. In one variation, the total (i.e., combination of base contribution combined with topical application) sodium concentration can be reduced to 125 or less mg sodium per ounce of product. The finished product has an acceptable finished product taste profile equivalent to a conventional product having a sodium content of 160 mg of sodium (i.e., without employing potassium and/or choline chloride).

If desired, nutritive carbohydrate sweeteners can be additionally included into the blend. Such sweeteners can comprise, for example, sucrose, fructose, glucose, corn syrup, honey, maple syrup solids, fruit juice solids, and mixtures thereof. However, still another consumer food product nutritional trend is a desire to reduce the sugar content of consumer food product. If present, such nutritive carbohydrate sweeteners can collectively comprise about 0.1% to 5% of the precook blend, though in some instances may be as high as 25%. In certain low sugar embodiments, such added sugars comprise 2% or less of the precook blend. In still another embodiment, cereal formulations are substantially free (less than 0.5% of any one) of divalent cation chloride salts such as magnesium chloride or calcium chloride which may increase bitterness but do not increase saltiness significantly.

The present cereal compositions can additionally comprise a variety of other minor ingredients intended to make the cereal compositions nutritionally, organoleptically or visually appealing. Such materials can include, for example, vitamins, mineral fortifiers, colors, and flavors. If present, these materials can each comprise from about 0.1% to 2% by weight of the composition. Especially preferred for use herein is tripotassium phosphate ("TKP") which serves as a pH buffering agent. Useful concentrations of TKP range from about 0.1% to 0.5%.

The precook dry blend is then admixed with sufficient amounts of moisture or water, such that upon completion of the cooking step, adequate moisture is present to gelatinize and hydrate the starch component of the farinaceous material. Useful amounts of water essentially range from about 18% to 35% by weight of the homogeneous blend so as to achieve approximately these concentrations of moisture in the cooked cereal. Modest adjustments to the water addition are to be made in known manner, in view of any moisture gain from steam condensation occasioned by cooking. Better results are obtained when the water comprises about 25% to 30% to achieve a cooked cereal dough of such moisture content. In addition to the water, various liquid ingredients such as corn (maize) or malt syrups can be added. The amount of moisture depends, in part, upon the particular cereal ingredients, desired finished products, cooking equipment and techniques employed. The moisture includes the water contribution from the cereal ingredients themselves (which often are controlled to about 12-15% moisture), the moisture added with any syrup—component as well as the moisture added through steam or water per se addition Thereafter, the homogeneous blend is cooked at conditions of elevated temperature and pressure to gelatinize the starchy component of the farinaceous material and to develop the cooked cereal flavor components herein.

Of course, useful cooking methods for cooking cereals include several different categories including boiling water cookers, steam cookers, low shear high pressure extruders, low shear low pressure cookers, adiabatic extruders, high shear extruders, and high shear extruders with steam precookers (sometimes called conditioners). Broadly, these different categories, however, can be divided into short cook systems, e.g., 15 seconds to three minutes, and long cook cookers, e.g., 30 minutes to eight hours. Inasmuch as the cooking step is preferably continued for times sufficient to achieve minimum flavor (pyrazine concentrations) the present method comprises long term cooking methods in certain preferred embodiments. These long term cooking methods include boiling water cookers, steam cookers (operated at lower steam pressures) and high shear extruders but with steam precookers.

The cooking step can also be practiced with high temperatures achievable only under high pressure. Preferred for use herein are steam cookers and high shear extruders with steam precookers. When steam cookers are employed, the steam pressures typically range from about 15 to 30 psig and cook times are considerably shortened, ranging from about 0.5 to 1.5 hours. When high shear extruders with steam precookers are employed, the blend remains in the precooker or conditioner for about 0.5 to 1.0 hours at a steam pressure of about 10 to 30 psig (about 170-300 KPa.) prior to finish cooking in the extruder. Useful cooking temperatures essentially range from about 250° F. to 300° F. (121° C. to 149° C.).

A cooked cereal composition can be prepared by a first sub-step of blending various dry cereal ingredients (at least partially un-gelatinized grain based material) together with water or steam and cooking to gelatinize the starchy components and to develop a cooked flavor to form a cooked cereal component. The cooked cereal material can also be and step can additionally comprise the sub-step of mechanically working the cooked cereal ingredients. The cooking and mechanical work can occur simultaneously or sequentially such as in a single or twin screw extruder.

Thereafter, the cooked cereal dough so realized characterized by a lower sodium concentration can be subsequently processed in conventional manner in order to realize the present R-T-E cereals. The post cooking processing of cooked cereal doughs can vary widely depending on the desired R-T-E cereal.

In one highly preferred embodiment of the present invention, the cooked cereal dough prepared as described above is subsequently extruded employing a low pressure extruder into a pelletizer. The pelletizer fabricates pellets characterized by a moisture content of about 20% to 35%. The size of pellets can vary and generally range from about 60 to 100, preferably 75 to 95 per 10 g.

The pellets are then dried in a dryer at temperatures ranging from 150° F. to 350° F. (~65-175° C.) and reduced moisture to a range of 8-25%. The pellet drying step can be practiced in a conventional pellet dryer such as the three pass pellet dryer depicted. Such three pass dryers have an upper endless conveyor that receives the wet pellets and advances them through the dryer. The partially dried pellets then fall upon a second dryer disposed there below advancing in reverse direction whereby the pellets are further dried. Finally, the pellets fall upon a third conveyor to complete the drying step forming the dried pellets. The dryer can be a forced hot air type operated at air temperatures ranging, for example, from about 50-70° C. Typical residence times within the dryer can range from about 10-90 minutes. In other variation, a single pass dryer can also be used although such dryers are less preferred due to their larger footprint within a commercial production facility. Half products that are shipped to separate locations for further processing into finished products such as fried snacks preferably range from about 10% to 14% moisture to provide shelf stable products. Pellets used in R-T-E cereal plants that are typically further processed in short order and thus that do not require shelf stability can range from about 8% to 25% moisture. Finished dried R-T-E cereals can have moisture contents of about 2% to 5% while fried snack products can be 1% to 3% moisture. The skilled artisan will appreciate that the drying step depends importantly in-part upon the desired end product. For example, for end products in the form of puffable half products or pellets for snack production, the drying step can be practiced to provide a "finish" moisture content of about 8 to 15%. However, when the desired end product is a flaked R-T-E cereal, drying the pellets to these moisture contents may only be an intermediate or sub-step prior to, for example, flaking the dried pellets to form "wet flakes" prior to toasting of the flakes.

In one embodiment, the pellets are gun puffed to form puffed or expanded pieces fabricated from the cooked cereal dough (for a good description of gun puffing, See for example, U.S. Pat. No. 3,231,387 "METHOD AND APPARATUS FOR CONTINUOUS PUFFING issued Jan 1966 to Tsuchiya et al.). The desirable cooked cereal and toasted flavors are fully developed in the gun puffing step.

In another variation, the dried pellets can then be fed to a flaking roll wherein they are reduced to a thickness ranging from about 0.08 to 0.10 inches. Thereafter, the flakes are then toasted in a toaster (e.g., a jet zone heater) which simultaneously reduces the moisture content to about 1% to 3%, provides a toasted flavor and partially expands the product to improve its texture and other organoleptic attributes. The desirable cooked cereal and toasted flavors are fully developed in the toaster.

The desirably high cooked cereal flavors are generally attributable to the presence of pyrazines and pyrazine derivative compounds and other volatile compounds. Examples of pyrazines found in the puffed or flaked cereals are:
Pyrazine
2-methyl pyrazine
2,3-dimethyl
2,5-dimethyl pyrazine
2,6-dimethyl pyrazine
ethyl pyrazine
2-ethyl 5-methyl pyrazine
2-ethyl 6-methyl pyrazine
2-ethyl 3-methyl pyrazine
2-ethyl 3,5-dimethyl pyrazine
2-ethyl 3,6-dimethyl pyrazine
tetra methyl pyrazine.

The puffed or toasted cereal products can be characterized by having a total pyrazines concentration of at least 200 ppm. Better results are obtained when the puffing or toasting steps are practiced such as to provide a total pyrazines concentration of at least 250 ppm.

The present invention finds particular suitability for use in connection with puffed or expanded finished cooked cereal dough products such as puffed R-T-E cereals and puffed snacks (fried or baked). Such puffed cooked cereal dough products are characterized by specific densities ranging from about 0.1 to 0.5 g/cc. Of course, quantities of such puffed finished food products will be characterized by lower bulk densities due to their varying shapes and sizes that affect their packing factors.

An additional subsequent step is to apply a saline solution to the R-T-E cereal pieces of reduced sodium content. Unlike oily snack products, dry salt will not adhere to the cereal pieces. Wetting the cereal piece to promote solid salt adhesion, however, would require application of water in amounts which damage the textural qualities of the cereal piece. In preferred embodiments, this step is practiced immediately prior to the final drying step, i.e., without intermediate R-T-E cereal processing steps which would materially alter the physical surface of the cereal piece. However, when fragile pieces, e.g., whole wheat flakes are employed, the topical saline solution application step can and preferably will be performed prior to flaking and toasting such as by applying to pellets formed from cooked cereal dough. For puffed cereals, the saline solution should be applied after puffing. For sugar coated cereals, it is best that the saline solution application should follow the sugar coating operation. Steps which do not materially alter the cereal piece surface to cause penetration of the topical salt into the cereal piece interior, e.g., vitamin fortification, however, can be practiced subsequently.

In preferred embodiments, the saline solution consists essentially of sodium chloride and water. The saline concentration can range from about 1% to 36%. Preferred solutions comprise salt concentrations ranging from about 15% to 36% salt. Higher salt concentrations are desired, in part, since less water is added which subsequently must be removed by expensive drying. Also, dilute saline solutions can adversely affect product textural attributes. On the other hand, very high salt concentrations are undesirable since they are difficult to work with since salt precipitation will tend to occur. Moreover, providing an even coating to the cereal pieces is more difficult. For best results, the saline solution consists essentially of about 20% salt. In less preferred embodiments, the saline solution can additionally comprise from about 0.1% to 10% of a high potency sweetener and from about 0.1% to 1% of a gum to aid suspension and adherence of the high potency sweetener.

Any conventional application apparatus and technique can be used to practice the present enrobing or application step. Generally, a useful technique involves tumbling. The cereal piece(s) and saline solution are each charged in any order to a rotating drum and tumbled for a sufficient time to achieve an even distribution of the suspension on the comestible. Preferably, the saline solution is added after the cereal has been added to the drum. Another useful technique is simply spraying the aqueous solution over those cereals which are desirably not tumbled due to the shape, frangibility, etc. Generally about 0% to 70%, preferably about 15% to 40% of the total sodium chloride can be applied topically while the balance of the sodium chloride is associated with the cereal formulation. For best results, the topical portion is approximately 33% and the portion contained in the cereal formulation comprises about 67% of the total sodium chloride. Good results are obtained when sufficient amount of sodium chloride is topically applied to supply about 5-50 mg topical sodium per ounce of finished product.

In certain embodiments, the present R-T-E cereals can be fortified with bioavailable sources of calcium, iron, riboflavin and the like. These mineral fortifiers can be incorporated into the cereal compositions directly. It is also desirable to vitamin fortify the present R-T-E cereals, especially selected B vitamins, e.g., riboflavin. Conventional methods and techniques of vitamin fortification can be used herein. Due in part to their heat sensitivity, vitamin fortification is typically practiced by topical application to the R-T-E cereal and such a technique is preferred herein.

This preferred product aspect provides RTE cereal or snack products in the form of a puffed grain based product piece having a density of about 10 to 200 g/l., a moisture content of 1.5% to 5%

If desired, the present cereal compositions can be fabricated into presweetened R-T-E cereals such as by the topical application of a conventional sweetener coating. Both conventional sugar coatings and coatings employing high potency sweeteners, especially aspartame and potassium acesulfame, are known and can be used to provide presweetened cereals for use herein.

In other variations, an oil topical coating optionally with flavors is applied to form finished dried snack products.

If employed, the topical sweetening is applied in sufficient amounts such that after drying to remove added moisture associated with the sugar coating solution, the sugar coating is present in a weight ratio of sugar coating to cereal base of about 1:100 to about 100:100, preferably 10:100 to about 67:100. Typically, the sugar coating solution will have a blend of sugars and will comprise about 4 to 20% moisture. When higher amounts of the sugar coating solution, particularly for those solutions employing higher moisture levels, the slurry coated cereal pieces may be subjected to a final drying step to remove the added moisture from the sugar coating to provide finished dried products having a moisture content of about 1 to 5%.

In one embodiment for ready-to-eat cereals, the present cereal compositions comprise and are defined in part by low fat levels, i.e., the present cereals do not comprise added or absorbed fat. Thus, the total fat or lipid component is quite low. The fat content results from the native fat associated with the starchy cereal component(s). Permissible low fat additions can also result from adding emulsifiers and from vitamin or flavor addition. However, the total fat content of the cereal compositions should be less than about 10%, preferably less than about 2%. Preferably, the R-T-E cereal is substantially free of any fat or oil incorporated into the cooked cereal dough. Such "added fat" is to be distinguished from "absorbed fat" that is picked up during deep fat frying used to prepare finished snack products herein. In more preferred embodiments, R-T-E cereals are further characterized as free of any absorbed fat. In another embodiment, the products can comprise a topically applied oil such as to facilitate adhesion of a flavor coating especially a cinnamon flavored particulate sugar coating.

In another preferred variation, the cooked cereal dough is formed into individual "O" shaped pieces or rings, letters, biscuits, shreds, figurines, spheres or flakes or other geometric shapes, nuggets, or even irregular shapes.

The finished dried R-T-E cereal can be packaged and distributed in conventional form The finished dried R-T-E cereal and cereal based snack products fabricated from the potassium chloride and choline chloride bearing cooked cereal doughs herein are useful as low sodium food products. Surprisingly, the finished R-T-E cereal and cereal-based snack products provided herein are remarkably similar to their unfortified counterparts, even though containing reduced levels of sodium. Good flavor, good texture and other favorable organoleptic attributes characterize the products. The present finished products are remarkably free of the undesirable light discoloration heretofore associated with finished light colored dried cereal products low in sodium content.

The finished reduced sodium content product yields a salty taste perception and cereal flavor profile similar to cereals containing higher conventional sodium concentrations and desirably comprises from about 0.1 to 1.3% total sodium chloride, preferably from about 0.35% to 0.8% salt The present invention finds particular suitability for use in connection with puffed oat based rings and toasted oat flakes. While the present invention can be used in connection with sugar coated cereals, the present invention finds particular suitability for use in connection with non-sugar coated cereals since sugar coating may mask modestly the benefits of the present invention.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. A method for preparing a cooked cereal dough food product, comprising the steps of:
    providing a dry starting ingredient blend including:
        50 to 99% of the dry blend of a cereal ingredient having a starch component;
        Sufficient amounts of sodium chloride to provide a sodium concentration of about 5 to 140 mg/ounce (dry basis) in the dry blend to define a first sodium portion;
        14 to 100 mg/ounce of potassium chloride (dry basis) in the dry blend; and
        55 to 150 mg/ounce of choline chloride (dry basis) in the dry blend;
    cooking the dry blend with sufficient amounts of moisture to provide a cooked cereal dough having a moisture content of about 20 to 35% and wherein at least 90% of the starch is gelatinized;
    forming the cooked cereal dough into puffable pellets having a moisture content of about 8-25%, said pellets having a pellet count of about 10-100 per 10 g and wherein the dough has an initial pyrazine level of 100 ppm or less;
    puffing the puffable pellets to provide puffed pieces by heating the pellets to about 140 to 482° C. under pressure ranging from about 0.22 to 1.47 MPa. (30 to 200psig.) for times sufficient to develop pyrazine flavor constituents and explosively discharging the heated pellets to atmospheric pressure whereby the moisture rapidly expands to puff the pellets and to provide puffed cereal pieces having a moisture content of about 2-5% and a pyrazine content of at least 200 ppm;
    topically applying to the puffed cereal pieces an aqueous saline solution having sodium chloride in amounts sufficient so as to apply a second sodium portion to the surface in a weight ratio of sodium chloride to cereal pieces such that the total sodium chloride content provided by the first and second sodium portions ranges from about 0.1% to 1.3% by weight to form cereal pieces coated with the second sodium portion; and
    final drying the coated cereal pieces to provide finished cereal products having a moisture content of about 1% to 5% by weight.

2. The method of claim 1 wherein the dry blend has a sucrose content of 5% or less.

3. The method of claim 1 wherein a weight ratio of potassium chloride to choline chloride ranges from about 1:2 to 2:1.

4. The method of claim 3 wherein at least a portion of the cereal ingredient is an oat ingredient.

5. The method of claim 4 wherein at least the major portion of the cereal ingredient is an oat ingredient.

6. The method of claim 5 wherein at least a majority of the cereal ingredient is an oat ingredient.

7. The method of claim 6 wherein the total sodium of the finished cereal products ranges from about 50-80 mg/oz.

8. The method of claim 7 wherein the weight ratio of potassium chloride to choline chloride ranges from about 40:60 to 60:40.

9. The method of claim 8 wherein the puffing step is practiced to provide puffed pieces having a total pyrazine content of at least 250 ppm.

10. A puffed food product fabricated from a cooked cereal dough, said puffed food product having a first sodium portion providing a sodium content ranging from about 50-80 mg per ounce, about 60 to 80 mg of potassium chloride, about 90 to 120 mg per ounce of choline chloride and a total pyrazine content of at least 200 ppm and topically applied sodium chloride providing a second sodium portion in amounts sufficient to provide a total sodium content of the puffed food product, provided by the first and second sodium portions, of less than 125 mg sodium per ounce.

* * * * *